United States Patent
Jahns et al.

(10) Patent No.: US 9,926,452 B2
(45) Date of Patent: Mar. 27, 2018

(54) USE OF AQUEOUS POLYMER DISPERSION IN COATING AGENTS FOR IMPROVING COLOUR RETENTION

(71) Applicant: BASF SE, Ludwigshafen (DE)

(72) Inventors: Ekkehard Jahns, Weinheim (DE); Sebastian Roller, Mannheim (DE); Alexander Kurek, Thierhaupten (DE); Ivan Cabrera, Dreieich (DE); Xavier Mollat Du Jourdin, Mannheim (DE); Nicolas Tissier, Strasbourg (FR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/440,503

(22) PCT Filed: Nov. 6, 2013

(86) PCT No.: PCT/EP2013/073145
§ 371 (c)(1),
(2) Date: May 4, 2015

(87) PCT Pub. No.: WO2014/075969
PCT Pub. Date: May 22, 2014

(65) Prior Publication Data
US 2015/0307716 A1    Oct. 29, 2015

Related U.S. Application Data

(60) Provisional application No. 61/726,597, filed on Nov. 15, 2012.

(30) Foreign Application Priority Data

Nov. 15, 2012  (EP) ..................................... 12192770

(51) Int. Cl.
    C09D 4/00     (2006.01)
    C09D 133/00   (2006.01)
    C08F 220/14   (2006.01)
    C08K 3/00     (2018.01)

(52) U.S. Cl.
    CPC .............. C09D 4/00 (2013.01); C08F 220/14 (2013.01); C09D 133/00 (2013.01); C08K 3/0033 (2013.01)

(58) Field of Classification Search
    CPC ....... C08F 220/14; C08K 3/0033; C09D 4/00; C09D 133/00
    See application file for complete search history.

(56) References Cited

U.S. PATENT DOCUMENTS

| 4,269,749 A | 5/1981 | Marriott et al. |
| 4,733,005 A | 3/1988 | Schmidt et al. |
| 5,494,963 A * | 2/1996 | Hayes ................... C08F 212/14 524/813 |
| 5,905,114 A | 5/1999 | Baumstark et al. |
| 2007/0148357 A1* | 6/2007 | Joecken ................. C09D 5/02 427/407.1 |
| 2012/0121921 A1 | 5/2012 | Cosyns et al. |

FOREIGN PATENT DOCUMENTS

| DE | 196 24 299 A1 | 1/1997 | |
| DE | 196 21 027 A1 | 11/1997 | |
| DE | 197 41 184 A1 | 3/1999 | |
| DE | 197 41 187 A1 | 3/1999 | |
| DE | 198 05 122 A1 | 4/1999 | |
| DE | 198 28 183 A1 | 12/1999 | |
| DE | 198 39 199 A1 | 3/2000 | |
| DE | 198 40 586 A1 | 3/2000 | |
| DE | 198 47 115 C1 | 5/2000 | |
| EP | 0 081 083 A2 | 6/1983 | |
| EP | 0794467 A2 * | 9/1997 | ......... G03G 9/08706 |
| EP | 0 810 274 A1 | 12/1997 | |
| EP | 0 771 328 B1 | 10/1998 | |
| EP | 0 789 724 B1 | 3/1999 | |
| WO | WO 99/25780 A1 | 5/1999 | |
| WO | WO 2011/009874 A1 | 1/2011 | |
| WO | WO 2011/051206 A1 | 5/2011 | |

OTHER PUBLICATIONS

International Search Report dated Jan. 27, 2014 in PCT/EP2013/073145 (with English Translation of Category of Cited Documents).
T.G. Fox, "Bulletin of the American Physical Society" The American Physical Society, Columbia University, Series II, vol. 1, No. 3, Mar. 15-17, 1956, p. 123 (with Cover Page).
"Polyacryl-Verbindungen bis Quecksilber" Ullmanns Encyklopadie der technischen Chemie, vol. 19, 1980, pp. 17-20 (with Cover Page).
Barbara Elvers, et al., "Polyacrylates" Ullmann's Encyclopedia of Industrial Chemistry, vol. A21, 1992, 8 Pages.

* cited by examiner

Primary Examiner — Jessee Roe
Assistant Examiner — Alexander Polyansky
(74) Attorney, Agent, or Firm — Oblon, McClelland, Maier & Neustadt, L.L.P.

(57) ABSTRACT

The present invention provides the use of aqueous polymer dispersions comprising (a) at least two monomers M1 having a glass transition temperature ≥25° C., (b) at least two monomers M2 having a glass transition temperature <25° C., and also further monomers M3, as binders in coating materials for improving the shade stability (color retention).

2 Claims, No Drawings

USE OF AQUEOUS POLYMER DISPERSION IN COATING AGENTS FOR IMPROVING COLOUR RETENTION

CROSS REFERENCE TO RELATED APPLICATIONS

This application is a national stage application of the PCT/EP13/073145 application, filed Nov. 6, 2013, which claims priority to U.S. provisional patent application 61/726,597, filed Nov. 15, 2012, which claims priority to European application 12192770.1, filed Nov. 15, 2012, the entire contents of each of which are hereby incorporated herein by reference.

BACKGROUND OF THE INVENTION

Field of Invention

The present invention provides the use of aqueous polymer dispersions comprising (a) at least two monomers M1 having a glass transition temperature ≥25° C., (b) at least two monomers M2 having a glass transition temperature <25° C., and also further monomers M3, as binders in coating materials for improving the shade stability (color retention).

Discussion of the Background

Aqueous polymer dispersions are general knowledge. They are fluid systems whose disperse phase, in disperse distribution in the aqueous dispersing medium, comprises polymer coils which consist of a plurality of intertwined polymer chains and which represent what is called the polymer matrix or polymer particles. The average diameter of the polymer particles is frequently in the range from 10 to 1000 nm, more particularly in the range from 50 to 500 nm. Aqueous polymer dispersions are used as binders in a multiplicity of technical applications.

Aqueous polymer dispersions have become standard binders for exterior paints. They provide stable, long-lived, water- and weather-resistant, decorative coatings, mostly on inorganic building materials, but also on wood or on metal surfaces. For a long time, white exterior paints were the most widespread, protecting the surfaces of buildings. Recent years, however, have seen increased use of colorful exterior paints. In tandem with this development, new problems have arisen, including the color fading of these exterior paints. This fading refers to the unwanted lightening of these paints after a certain time on the house frontage. With certain shades this phenomenon may appear after just one or two years, as in the case of red or blue, for example.

Color fading is particularly severe when using organic pigments, which are used on account of the intense color they produce. Severe color fading is also observed with mixed use of organic color pigments together with white titanium dioxide pigment. Those in the art attribute the tendency toward color fading predominantly to the instability of the organic color pigments. These color pigments themselves have a lower sunlight UV stability than, for example, the inorganic color pigments. The quality of the organic binders themselves is not debated as a strong influencing parameter among those in the art.

Water-based polymer dispersions as binders for exterior paints and renders are typically produced from a principal monomer having a high glass transition temperature (hard monomer) and a principal monomer having a low glass transition temperature (soft monomer). Hard monomers selected are usually styrene or methyl methacrylate; the soft monomer selected is usually n-butyl acrylate or else 2-ethylhexyl acrylate. The exterior paint binders are therefore referred to as styrene acrylates or, when the hard monomer used is methyl methacrylate, as straight acrylates. For reasons of good outdoor weathering stability, the majority of binders consist of styrene/n-butyl acrylate or of methyl methacrylate/n-butyl acrylate. The respective amounts of hard and soft monomers are selected in each application scenario with reference to the glass transition temperature required for the specific use. Binders for solvent-free exterior paints usually have a glass transition temperature in the range of 0-5° C., low-solvent exterior paints in the range of 5-20° C., and solventborne exterior paints in the range from 20 to 40° C.

EP771328 for example describes such prior-art binders, as in examples A, J, and K, for instance.

Controlled variation in the nature and amount of the monomers allows the skilled person in accordance with the invention to prepare aqueous polymer compositions whose polymers have a glass transition temperature within the desired range. Guidance is possible by means of the Fox equation. According to Fox (T. G. Fox, Bull. Am. Phys. Soc. 1956 [Ser. II] 1, page 123 and according to Ullmann's Encyclopädie der technischen Chemie, vol. 19, page 18, 4th edition, Verlag Chemie, Weinheim, 1980), the glass transition temperature of copolymers can be calculated in good approximation as follows:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers constructed in each case only from one of the monomers 1, 2, ... n, in degrees Kelvin. The $T_g$ values for the homopolymers of the majority of monomers are known and are listed for example in Ullmann's Encyclopedia of Industrial Chemistry, volume A21, page 169, 5th edition, VCH Weinheim, 1992; further sources of glass transition temperatures for homopolymers include, for example, J. Brandrup, E. H. Immergut, Polymer Handbook, 1st edition, J. Wiley, New York 1966, 2nd edition, J. Wiley, New York 1975, and 3rd edition, J. Wiley, New York 1989. For ethyl acrylate a figure of −13° C. is used.

The actual glass transition temperature may be determined by means of differential scanning calorimetry (ASTM D 3418-08, midpoint temperature).

DETAILED DESCRIPTION OF THE INVENTION

It was an object of the present invention to provide polymer dispersions which exhibit markedly better color retention in exterior paints and renders with organic binders than do comparable binders from the prior art.

The object has been achieved through the use of an aqueous polymer dispersion, comprising
(a) at least two monomers M1 having a glass transition temperature ≥25° C.,
(b) at least two monomers M2 having a glass transition temperature <25° C.,
and also, optionally, further monomers M3, as binder in coating materials for improving color retention.

The color fading is sometimes associated with the UV stability of the binder. Surprisingly, however, the use of the binder of the invention, even in highly filled, low binder paints, still produces a markedly lower level of color fading. This was not foreseen by the skilled person, since with the low binder fraction in highly filled paints the effect of weathering, such as color retention or UV stability on an exterior paint is attributable only to a very inferior degree to the quality of the binder.

The invention further provides aqueous polymer dispersions comprising
(a) at least two monomers M1 having a glass transition temperature ≥25° C.,
(b) at least two monomers M2 having a glass transition temperature <25° C.,
and also, optionally, further monomers M3, with markedly enhanced color retention in exterior paints and renders. The color retention improvement has been found for different, organic pigment types and concentrations (signal red, blue, yellow, green, etc.).

This had not been expected by the skilled worker, since for exterior paints and renders a high fraction of pigments and fillers in the paints was intended to provide adequate protection to the small fractions of binder, by light scattering, and the quality of the binder, according to the prior art, is therefore of minor importance. Thus, for example, in Europe, high fractions of styrene acrylates are used as binder for exterior paints and renders, and are known to have a poorer UV resistance than, for example, straight acrylates. In the case of the light-colored or white exterior paints and renders, however, weathering tests show no significant deficits on the part of styrene acrylates as compared with straight acrylates.

The use of the at least four principal monomers M1 and M2 in a binder surprisingly improves the durability of an exterior paint to such a marked extent that the color retention is markedly enhanced and a paint with a service life extended by several years can be produced.

The following monomers may be used, in accordance with the invention, for the polymerization:

Examples of the monomers M1 having a glass transition temperature ≥25° C. are vinylaromatic compounds, such as vinyltoluene, alpha- and para-methylstyrene, alpha-butylstyrene, 4-n-butylstyrene, and—preferably—styrene, C1 to C4 alkyl methacrylates, namely MMA, ethyl methacrylate, n-propyl methacrylate, isopropyl methacrylate, n-butyl methacrylate, tert-butyl acrylate, isobutyl methacrylate, tert-butyl methacrylate, tert-butyl acrylate, cyclohexyl methacrylate, stearyl acrylate, vinyl acetate, and/or ethylenically unsaturated nitriles. Examples of nitriles are acrylonitrile and methacrylonitrile. Vinyl halides are chloro-, fluoro-, or bromo-substituted ethylenically unsaturated compounds, preferably vinyl chloride and vinylidene chloride.

Suitable as monomers M2 having a glass transition temperature <25° C. are, for example, C1 to C20 alkyl acrylates, such as methyl acrylate, ethyl acrylate, n- and isopropyl acrylate, n-, iso-, and sec-butyl acrylate, n- and isopentyl acrylate, n-hexyl acrylate, 2-ethylhexyl acrylate, heptyl acrylate, octyl acrylate, C10 isoamyl guerbet acrylate, 2-propylpentyl acrylate, 1-propylheptyl acrylate, lauryl acrylate, C5 to C20 alkyl methacrylates such as n- and isopentyl methacrylate, n-hexyl methacrylate, heptyl methacrylate, octyl methacrylate, C10 isoamyl guerbet methacrylate, 2-propylpentyl methacrylate, 2-propylheptyl methacrylate, lauryl methacrylate, vinyl esters of unbranched or branched carboxylic acids having 2 to 11 C atoms, such as vinyl propionate, vinyl butyrate, 1-methylvinyl acetate, vinyl pivalate, and vinyl esters of α-branched monocarboxylic acids having 9 C atoms (VeoVa9$^R$, trade name of Shell), such as vinyl 2-ethylhexanoate, vinyl laurate, vinyl esters of α-branched monocarboxylic acids having 10 or 11 C atoms (VeoVa10$^R$, VeoVa11$^R$, trade name of Shell), and vinyl esters of branched monocarboxylic acids having 10 to 13 C atoms (Exxar Neo12), C1-C20 vinyl ethers, such as methyl vinyl ether, ethyl vinyl ether, propyl vinyl ether, butyl vinyl ether, pentyl vinyl ether, hexyl vinyl ether, heptyl vinyl ether, octyl vinyl ether, nonyl vinyl ether, decyl vinyl ether, etc., butadiene, vinylidene chloride, and butanediol monoacrylate.

For the monomers M1 it is preferred to use one more hydrophilic monomer and one more hydrophobic monomer, respectively, with particular preference, the duos styrene/methyl methacrylate or cyclohexyl methacrylate/methyl methacrylate.

For the monomers M2 it is preferred to use one more hydrophilic monomer and one more hydrophobic monomer, respectively, with particular preference, the duo n-butyl acrylate/ethylhexyl acrylate.

It is optionally possible additionally to make use in minor amounts, as for example of less than 10 weight %, preferably less than 8 weight %, more preferably less than 6 weight %, of monomers M3.

Examples of these further monomers M3 are ethylenically unsaturated monocarboxylic and dicarboxylic acids, such as acrylic acid, methacrylic acid, itaconic acid, fumaric acid and maleic acid, aconitic acid, mesaconic acid, crotonic acid, citraconic acid, acryloyloxypropionic acid, methacryloyloxypropionic acid, vinylacetic acid, monomethyl itaconate, monomethyl fumarate, monobutyl fumarate, acrylic anhydride, methacrylic anhydride, maleic anhydride, or itaconic anhydride,
acrylamidoglycolic acid and methacrylamidoglycolic acid, acrylamide, methacrylamide, and isopropylacrylamide, substituted (meth)acrylamides, such as, for example, N,N-dimethylamino (meth)acrylate; 3-dimethylamino-2,2-dimethylprop-1-yl(meth)acrylate, N-dimethylaminomethyl-(meth)acrylamide, N-(4-morpholinomethyl)(meth) acrylamides, diacetonacrylamide; acetoacetoxyethyl methacrylate; N-methylol(meth)acrylamide, polyethylene oxide (meth)acrylate, methoxypolyethylene oxide (meth) acrylate, acrolein, methacrolein; N-(2-methacryloyloxy-ethyl)-ethyleneurea, 1-(2-(3-allyloxy-2-hydroxypropylamino)ethyl)imidazolidin-2-one, ureido(meth)-acrylate, and 2-ethyleneureidoethyl methacrylate.

Additionally suitable are the following: ethylenically unsaturated, hydroxyalkyl-functional comonomers, such as hydroxyalkyl esters of acrylic and methacrylic acid with a $C_1$ to $C_5$ alkyl radical such as hydroxyethyl, hydroxypropyl, or hydroxybutyl acrylate or methacrylate; hydroxyethyl (meth)acrylate and hydroxypropyl(meth)acrylates; 4-hydroxybutyl acrylate, 4-hydroxybutyl methacrylate, glycidyl (meth)acrylate, and also N-vinylpyrrolidone, and vinylimidazole.

Particular preference is given acrylic acid, methacrylic acid, acrylamide, hydroxyethyl (meth)acrylate and hydroxypropyl (meth)acrylate.

Further examples of the monomers M3 are phosphorus-containing monomers, examples being vinylphosphonic acid and allylphosphonic acid. Also suitable are the monoesters and diesters of phosphonic acid and phosphoric acid with hydroxyalkyl (meth)acrylates, especially the monoesters. Additionally suitable are diesters of phosphonic acid and phosphoric acid which are esterified once with a hydroxyalkyl (meth)acrylate and additionally once with a different alcohol, such as an alkanol, for example. Suitable hydroxyalkyl (meth)acrylates for these esters are those specified below as separate monomers, more particularly 2-hydroxyethyl (meth)acrylate, 3-hydroxypropyl (meth) acrylate, 4-hydroxybutyl (meth)acrylate, etc. Corresponding dihydrogenphosphate ester monomers include phosphoalkyl (meth)acrylates, such as 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. Also suitable are the esters of phosphonic acid and phosphoric acid with alkoxylated hydroxyalkyl (meth)acrylates, examples being the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n stands for 1 to 50. Also suitable are phosphoalkyl crotonates, phosphoalkyl maleates, phosphoalkyl fumarates, phosphodialkyl (meth)acrylates, phosphodialkyl crotonates, and allyl phosphates. Further suitable monomers containing phosphorus groups are described in WO 99/25780 and U.S. Pat. No. 4,733,005, hereby incorporated by reference.

Additionally suitable are vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and the alkali earth metal salts or alkali metal salts thereof, examples being sodium styrene-3-sulfonate and sodium styrene-4-sulfonate, poly(allyl glycidyl ether) and mixtures thereof, in the form of various products with the designation Bisomer® from Laporte Performance Chemicals, UK. They include, for example, Bisomer® MPEG 350 MA, a methoxypolyethylene glycol monomethacrylate.

The functional groups of the monomers make a contribution to providing the composition with colloidal stabilization, not least when the overall formulation also comprises fillers, such as, for example, calcium carbonate or others. In this case the crosslinking takes place either by reaction with one another or by addition of a further crosslinking agent. The crosslinking preferably takes place only after the actual film formation.

Monomers which typically increase the internal strength of films of aqueous polymer dispersions normally have at least one epoxy, hydroxyl, N-methylol or carbonyl, or at least two nonconjugated ethylenically unsaturated double bonds. Examples thereof are N-alkylolamides of α,β-monoethylenically unsaturated carboxylic acids of 3 to 10 C atoms, and also the esters thereof with alkanols having 1 to 4 C atoms, among which N-methylolacrylamide and N-methylolmethacrylamide are especially preferred; monomers having two vinyl radicals, monomers having two vinylidene radicals, and also monomers having two alkenyl radicals. Particularly advantageous in this context are the diesters of dihydric alcohols with α,β-monoethylenically unsaturated monocarboxylic acids, among which acrylic acid and methacrylic acid are preferred. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, and also propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, or triallyl cyanurate.

Functional crosslinker groups are, for example, keto groups, aldehyde groups and/or acetoacetoxy carbonyl groups, and the subsequently added, formulated crosslinking agents may comprise a polyamine or polyhydrazide such as adipic dihydrazide (ADDH), oxalic dihydrazide, phthalic dihydrazide, terephthalic dihydrazide, isophoronediamine, and 4,7-dioxadecane-1,1-O-diamine, or a crosslinking agent that carries semicarbazide or hydrazine-functional groups.

Alternatively the polymer could carry hydrazide-functional groups and the subsequently formulated crosslinking agent could contain keto-functional groups.

The functional groups may also be carboxyl functions and the subsequently formulated crosslinking agent could contain aziridine groups, epoxide groups or carbodiimide-functional groups, or the functional groups may be silane-functional groups and the subsequently formulated crosslinking agent may likewise contain silane-functional groups.

The functional groups may also be ureido groups and the subsequently added crosslinking agent a polyaldehyde, examples being α,ω-dialdehydes containing one to ten C atoms, such as glyoxal, glutaraldehyde or malonaldehyde, and/or their acetals and hemiacetals. See EP 0789724.

The crosslinking here takes place either by reaction of one another or by addition of a further crosslinking agent. The crosslinking preferably takes place only after actual film formation. It is important here not to use too much additional crosslinking agent, since that may lead to residues of residual crosslinking agent. Too little crosslinking agent, on the other hand, may lead to a soluble coating.

It is important here not to use too much additional crosslinking agent, since that may lead to residues of residual crosslinking agent. Too little crosslinking agent, on the other hand, may lead to a soluble coating.

Also possible, of course, are combinations of the various functional groups and crosslinking mechanisms.

Vinylmonomers containing crosslinking groups are, for example, allyl, glycidyl or acetoacetoxy esters, acetoacetoxyamides, keto-functional and aldehyde-functional vinylmonomers, keto-containing amides such as diacetonacrylamide, or silane (meth)acrylic monomers.

Preferred vinylmonomers carrying crosslinking groups are acetoacetoxyethyl methacrylate (AAEM), diacetonacrylamide (DAAM), and silane (meth)acrylic monomers; the most preferred is DAAM.

Preferred crosslinking mechanisms comprise crosslinking of silane-functional groups and crosslinking of keto-functional with hydrazide-functional groups.

The most preferred is the combination of DAAM and ADDH crosslinking.

The weight ratio of the monomers M1 to M2 to M3 is dependent on the preferred application of the binder and is determined essentially via the glass transition temperature of the polymers prepared from the mixture of all the monomers.

Examples of preferred mixtures include the following:
a) very soft, elastic binders (Tg about −24° C.): 17 to 27% of monomers M1 (calculated on the basis of methyl methacrylate/styrene), 68-77% of monomers M2, and 0.1 to 10% of monomers M3 (calculated on n-butyl acrylate/2-ethylhexyl acrylate), the amount of styrene in the case of the monomers M1 being in the range of 5-15%.
b) Soft, self-filming binders (Tg about 0° C.): 34 to 44% of monomers M1 (calculated on the basis of methyl methacrylate/styrene), 49-59% of monomers M2, and 0.1 to 10% of monomers M3 (calculated on n-butyl acrylate/2-ethylhexyl acrylate), the amount of styrene in the case of the monomers M1 being in the range of 10-20%.
c) Binders for exterior paints and renders which require small fractions of film-forming assistant (Tg about 15-20° C.): 37 to 47% of monomers M1 (calculated on the basis of methyl methacrylate/styrene), 48-58% of monomers M2, and 0.1 to 10% of monomers M3 (calculated on n-butyl acrylate/2-ethylhexyl acrylate), the amount of styrene in the case of the monomers M1 being in the range of 10-25%.

d) Binders for exterior paints and renders which require larger fractions of film-forming assistant (Tg about 30-40° C.): 60 to 70% of monomers M1 (calculated on the basis of methyl methacrylate/styrene), 24-34% of monomers M2, and 0.1 to 10% of monomers M3 (calculated on n-butyl acrylate/2-ethylhexyl acrylate), the amount of styrene in the case of the monomers M1 being in the range of 10-25%.

Further preferred combinations can be easily self-determined on the basis of the listing above, for glass transition temperatures which have not been specified.

Preferred monomer combinations M1 are the duos styrene/methyl methacrylate or cyclohexyl methacrylate/methyl methacrylate, and, for the monomer combinations M2, the duo n-butyl acrylate/ethylhexyl acrylate.

For environmental reasons, filming of the binder in the range from <0 to 40° C. is the target, so that only small amounts, or none, of a film-forming assistant are required.

The polymer dispersion of the invention is prepared by emulsion polymerization. In the course of the emulsion polymerization, ethylenically unsaturated compounds (monomers) are polymerized in water, commonly using ionic and/or nonionic emulsifiers and/or protective colloids or stabilizers as surface-active compounds to stabilize the monomer droplets and the polymer particles that are subsequently formed from the monomers. In accordance with the invention, however, the polymerization takes place in a low-emulsifier regime. It is preferred to use in total less than 2.5 or less than 2.0 weight % of emulsifier, more particularly less than 1.5 weight %, based on the solids content of the polymer dispersion.

The polymer dispersion is typically prepared in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers include anionic, cationic, and nonionic emulsifiers. As surface-active substances it is preferred to use emulsifiers, whose relative molecular weights are typically below those of protective colloids. More particularly it has become established to use exclusively anionic emulsifiers, or to use a combination of at least one anionic emulsifier and at least one nonionic emulsifier.

Useful nonionic emulsifiers are araliphatic or aliphatic nonionic emulsifiers, examples being ethoxylated mono-, di-, and tri-alkylphenols (EO degree: 3 to 50, alkyl radical: $C_4$-$C_{10}$), ethoxylates of long-chain alcohols (EO degree: 3 to 100, alkyl radical: $C_8$-$C_{36}$), and also polyethylene oxide/polypropylene oxide homopolymers and copolymers. These copolymers may comprise the alkylene oxide units copolymerized with statistical distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Suitable anionic emulsifiers are, for example, alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208. Anionic emulsifiers likewise suitable are bis(phenylsulfonic acid) ethers and their alkali metal salts or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, examples being trimethylcetylammonium chloride, methyltrioctylammonium chloride, and benzyltriethylammonium chloride, or quaternary compounds of N—$C_6$-$C_{20}$ alkylpyridines, -morpholines, or -imidazoles, an example being N-laurylpyridinium chloride.

The polymer dispersions may also be admixed with customary auxiliaries and additives. These include, for example, pH modifiers, reducing agents, and bleaching agents, such as the alkali metal salts of hydroxymethanesulfinic acid (e.g., Rongalit® C from BASF Aktiengesellschaft), complexing agents, deodorants, odorants, and viscosity modifiers, such as alcohols, examples being glycerol, methanol, ethanol, tert-butanol, glycol, etc. These auxiliaries and additives may be added to the polymer dispersions in the initial charge, in one of the feeds, or after the end of the polymerization.

The acid groups of the first polymer are preferably neutralized by at least partial introduction of a neutralizing agent before and/or during the polymerization of the second stage. This neutralizing agent may be added in a common feed with the monomers to be polymerized, or in a separate feed. Following the feeding of all of the monomers, the amount of neutralizing agent present in the polymerization vessel is preferably the amount required for the neutralizing of at least 10%, preferably 25 to 100% or 50 to 95% of acid equivalents.

The emulsion polymerization may be commenced using water-soluble initiators. Water-soluble initiators are, for example, ammonium salts and alkali metal salts of peroxodisulfuric acid, e.g., sodium peroxodisulfate, hydrogen peroxide, or organic peroxides, e.g., tert-butyl hydroperoxide. Also suitable as initiator are what are called reduction-oxidation (redox) initiator systems. The redox initiator systems consist of at least one, usually inorganic, reducing agent and one organic or inorganic oxidizing agent. The oxidizing component comprises, for example, the emulsion polymerization initiators already specified above. The reducing component comprises, for example, alkali metal salts of sulfurous acid, such as sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used in conjunction with soluble metal compounds whose metallic component is able to exist in a plurality of valence states. Typical redox initiator systems are, for example, ascorbic acid/iron(II) sulfate/sodium peroxidisulfate, tert-butyl hydroperoxide/sodium disulfite, and tert-butyl hydroperoxide/Na hydroxymethanesulfinic acid. The individual components—the reducing component, for example—may also be mixtures: an example is the mixture of the sodium salt of hydroxymethanesulfinic acid and sodium disulfite.

The stated initiators are used mostly in the form of aqueous solutions, with the lower concentration being determined by the amount of water that is acceptable in the dispersion, and the upper concentration by the solubility of the respective compound in water. Generally speaking the concentration of the initiators is 0.1 to 30 weight %, preferably 0.2 to 20 weight %, more preferably 0.3 to 10 weight %, based on the monomers to be polymerized. It is also possible for two or more different initiators to find use for the emulsion polymerization.

The emulsion polymerization takes place in general at 30 to 130° C., preferably at 50 to 90° C. The polymerization medium may consist either just of water, or mixtures of water and water-miscible liquids such as methanol. It is preferred to use just water. The emulsion polymerization may be conducted either as a batch operation or in the form of a feed process, including a staged or gradient procedure.

The manner in which the initiator is added to the polymerization vessel in the course of the radical aqueous emulsion polymerization is familiar to a person of ordinary skill in the art. It can either be included fully in the initial charge to the polymerization vessel, or else introduced continuously or in stages at the rate of its consumption in the course of the radical aqueous emulsion polymerization. Individually this is dependent on the chemical nature of the initiator system and on the polymerization temperature. It is preferred to include a part in the initial charge and to supply the remainder to the polymerization zone at the rate of its consumption. For the purpose of removing the residual monomers, initiator is typically also added after the end of the emulsion polymerization proper, i.e., after a monomer conversion of at least 95%. In the case of the feed process, the individual components may be added to the reactor from above, in the side, or from below, through the reactor base.

The emulsion polymerization produces aqueous polymer dispersions generally with solids contents of 15 to 75 weight %, preferably of 40 to 75 weight %, more preferably of greater than or equal to 50 weight %. For a high space/time yield of the reactor, dispersions with a very high solids content are preferred. In order to be able to attain solids contents >60 weight %, a bimodal or polymodal particle size ought to be brought about, since otherwise the viscosity becomes too high and the dispersion can no longer be handled. Producing a new particle generation can be accomplished, for example, by adding seed (EP 81083), by adding excess amounts of emulsifier, or by adding miniemulsions. A further advantage associated with the low viscosity at high solids content is the improved coating performance at high solids contents. Producing one or more new particle generations may take place at any desired point in time. Said point in time is guided by the particle size distribution that is aimed at for a low viscosity.

Frequently, it is advantageous if the aqueous polymer dispersion obtained after the end of the polymerization stages is subjected to an aftertreatment for the purpose of reducing the residual monomer content. This aftertreatment takes place either chemically, as for example by completing the polymerization reaction by using a more effective radical initiator system (known as postpolymerization), and/or physically, as for example by stripping the aqueous polymer dispersion with steam or inert gas. Corresponding chemical and/or physical methods are familiar to the skilled person [see, for example, EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586, and 198 47 115]. The combination of chemical and physical aftertreatment affords the advantage that as well as the unreacted ethylenically unsaturated monomers, other disruptive volatile organic constituents (known as VOCs or volatile organic compounds) are also removed from the aqueous polymer dispersion. The dispersions according to the invention are preferably not chemically aftertreated.

The aqueous polymer dispersions obtainable by the method of the invention contain polymer particles which have a weight-average particle diameter $D_w$ in the range $\geq 10$ and $\leq 500$ nm, preferably $\geq 20$ and $\leq 200$ nm, and especially preferably $\geq 20$ nm to $\leq 100$ nm. The determination of the weight-average particle diameter is known to the skilled person and is accomplished, for example, via the method of the analytical ultracentrifuge. By weight-average particle diameter in this specification is meant the $D_{w50}$ weight average as determined by the method of the analytical ultracentrifuge (in this regard cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

The aqueous polymer dispersions obtainable by the method of the invention and having weight-average particle diameters $D_w \leq 100$ nm exhibit surprisingly good color retention and are therefore particularly suitable as binders for colorful exterior paints.

Furthermore, from the aqueous polymer dispersions of the invention, it is easy (by freeze drying or spray drying, for example) to obtain the corresponding polymer powders. These inventively obtainable polymer powders can likewise be employed as a component in the production of coating materials for organic substrates and also for modifying mineral binders.

The aqueous polymer dispersion typically has a solids content of 20 to 70 weight %, preferably 35 to 60 weight %.

The aqueous polymer dispersion obtained can be used as such or mixed with other, generally film-forming, polymers as a binder composition in aqueous coating materials.

The aqueous polymer dispersions of the invention that are obtainable by the method of the invention can of course also be employed as a component in the production of adhesives, sealants, polymeric renders, paper coating slips, fiber nonwovens, and coating materials for organic substrates, and also for modifying mineral binders.

Additionally provided by the invention is a coating material in the form of an aqueous composition comprising
  at least one polymer dispersion of the invention, as defined above,
  optionally at least one (in)organic filler and/or at least one (in)organic pigment,
  optionally at least one customary auxiliary, and
  water.

The binder compositions of the invention are employed preferably in aqueous paints, more particularly in exterior paints.

Fillers can be used in order to increase the hiding power and/or to save on the use of white pigments. To adjust the hiding power of the shade, and the depth of color, it is preferred to employ blends of color pigments and fillers.

Examples of suitable pigments are inorganic white pigments such as titanium dioxide, preferably in the rutile form, barium sulfate, zinc oxide, zinc sulfide, basic lead carbonate, antimony trioxide, lithopone (zinc sulfide+barium sulfate), or colored pigments, examples being iron oxides, carbon black, graphite, zinc yellow, zinc green, ultramarine, manganese black, antimony black, manganese violet, Paris blue or Schweinfurter green. Besides the inorganic pigments, the emulsion paints of the invention may also comprise organic color pigments, examples being sepia, gamboge, Cassel brown, toluidine red, Para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Ropaque® and AQACell® dispersions. Additionally suitable are the Luconyl® brands from BASF SE, such as, for example, Lyconyl® Yellow, Lyconyl® Brown, and Luconyl® Red, especially the transparent versions.

Suitable fillers are, for example, aluminosilicates, such as feldspars, silicates, such as kaolin, talc, mica, magnesite, alkaline earth carbonates, such as calcium carbonate, in the form for example as calcite or chalk, magnesium carbonate, dolomite, alkaline earth metal sulfates, such as calcium sulfate, silicon dioxide, etc. In paints of course, finely divided fillers are preferred. The fillers may be used as individual components. In practice, however, filler mixtures have been found especially appropriate, examples being calcium carbonate/kaolin, calcium carbonate/talc. Glossy paints generally have only small amounts of very finely divided fillers, or contain no fillers.

Finely divided fillers may also be used for increasing the hiding power and/or for saving on the use of white pigments. To adjust the hiding power of the shade, and the depth of color, it is preferred to use blends of color pigments and fillers.

The fraction of the pigments may be described by the pigment volume concentration (PVC). Coating materials of the invention have, for example, a PVC in the range from 5 to 85, with the binders of course also being suitable for clearcoat/transparent varnish applications where only very small, or no, fractions of pigments and/or fillers are added.

The coating material (aqueous paint) of the invention may comprise further auxiliaries in addition to the polymer dispersion.

The customary auxiliaries, as well as the emulsifiers used in the polymerization, include wetting agents or dispersants, such as sodium, potassium, or ammonium polyphosphates, alkali metal salts and ammonium salts of acrylic or maleic anhydride copolymers, polyphosphonates, such as sodium 1-hydroxyethane-1,1-diphosphonate, and also naphthalenesulfonic salts, more particularly the sodium salts.

Further suitable auxiliaries are flow control agents, defoamers, biocides, and thickeners. Examples of suitable thickeners include associative thickeners, such as polyurethane thickeners. The amount of the thickener is preferably less than 1 weight %, more preferably less than 0.6 weight %, of thickener, based on solids content of the paint.

Auxiliaries additionally suitable are film-forming assistants or coalescence aids. Preference is given to using, for example, white spirit, ethylene glycol, propylene glycol, glycerol, ethanol, methanol, water-miscible glycol ethers and their acetates such as diethylene glycol, 1-methoxy-2-propanol, 2-amino-2-methyl-1-propanol, isooctanol, butylglycol, butyldiglycol, diethylene glycol monobutyl ether, dipropylene glycol monomethyl ether or dipropylene glycolmonobutyl ether, dipropylene glycol methyl ether, dipropylene glycol propyl ether, dipropylene glycol n-butyl ether, tripropylene glycol n-butyl ether, propylene glycol phenyl ether, butylglycol acetate, butyl diglycol acetate, 2,2,4-trimethyl-1,3-pentanediol monoisobutyrate, disobutyl esters of long-chain dicarboxylic acids, such as Lusolvan® FBH, or tripropylene glycol monoisobutyrate.

The paints of the invention are produced in a known way by blending the components in mixing devices customary for the purpose. It has been found appropriate to prepare an aqueous paste or dispersion from the pigments, water, and optionally the auxiliaries, and only then to mix the polymeric binder—that is, in general, the aqueous dispersion of the polymer—with the pigment paste or pigment dispersion.

The paints of the invention contain in general 30 to 75 weight % and preferably 40 to 65 weight % of nonvolatile constituents. By these are meant all constituents of the preparation that are not water, but at least the total amount of binder, pigment, and auxiliary, based on the solids content of the paint. The volatile constituents are primarily water.

The paint of the invention may be applied in a customary way to substrates, as for example by spreading, spraying, dipping, rolling, knifecoating, etc.

The paint is used preferably as an architectural paint—that is, for the coating of buildings or parts of buildings. The substrates in question may be mineral substrates such as renders, plaster or gypsum plasterboard panels, masonry, or concrete, or else wood, wood-based materials, metal, or paper, such as wallpapers, or plastic, such as PVC.

The paints of the invention are notable for ease of handling, good processing properties, and enhanced color retention. The pollutant content of the paints is low. They have good performance properties, including for example good water resistance, high wet adhesion, high blocking resistance, and high recoatability, and they exhibit good flow on application. The equipment used can be easily cleaned with water.

The invention is elucidated in more detail by the following, nonlimiting examples.

EXAMPLES

Inventive Example

A 4 l glass vessel with anchor stirrer, heating and cooling devices, and various feed ports was charged at 20 to 25° C. (room temperature) under atmospheric pressure (1 atm $\hat{=}$ 1.013 bar absolute) with 423.0 g of deionized water and 14.0 g of a 20% strength by weight aqueous solution of a fatty alcohol polyethoxylate (Lutensol® AT 18 from BASF SE)

18.7 g of a 15% strength by weight aqueous solution of the sodium salt of a $C_{12}$ alkyl sulfate 53.2 g of the monomer emulsion (see below)

and then heated with stirring (140 rpm) to an internal temperature of 85° C. After this temperature had been reached, 5 weight % of the initiator solution was added in one portion, and the resulting mixture was stirred for 5 minutes. Thereafter, beginning simultaneously, the total amount of the monomer emulsion was metered in over the course of 185 minutes, and the remaining amount of the initiator solution was metered in over the course of 195 minutes, the metered feeds taking place continuously, at constant flow rates, via spatially separate feed ports.

Initiator Solution:
7 g of sodium peroxodisulfate
93 g of deionized water
Monomer Emulsion:
814.0 g of deionized water
10.6 g of a 20% strength by weight aqueous solution of a fatty alcohol polyethoxylate (Lutensol® AT 18 from BASF SE)
47.0 g of a 15% strength by weight aqueous solution of sodium lauryl sulfate
169.6 g of styrene
301.8 g of n-butyl acrylate
590.2 g of methyl methacrylate
307.4 g of ethylhexyl acrylate
14 g of acrylic acid, and
28 g of a 50% strength by weight aqueous solution of acrylamide.

The reaction mixture was then left to continue reacting at the aforementioned temperature for a further 15 minutes, after which the mixture was cooled to room temperature. The aqueous polymer dispersion obtained was subsequently adjusted to a pH of 8, using a 25% strength by weight aqueous ammonium hydroxide solution. The resulting polymer dispersion had a solids fraction of 50.5 weight %, a number-average particle diameter of 130 nm, and a glass transition temperature of 17° C.

The solids contents were ascertained generally by drying a defined amount of the aqueous polymer dispersion (approximately 0.8 g) to constant weight at a temperature of 130° C., using the HR73 moisture analyzer from Mettler Toledo (approximately 2 hours). Two measurements were conducted in each case. The figure reported in each case represents the average of these measurements.

The number-average particle diameters of the polymer particles were ascertained generally by dynamic light scattering on a 0.005 to 0.01 weight percent aqueous polymer dispersion at 23° C., using an autosizer IIC from Malvern Instruments, England. The figure reported is the average diameter of the cumulant evaluation (cumulant z average) of the measured autocorrelation function (ISO standard 13 321).

Comparative Example

A 4 l glass vessel with anchor stirrer, heating and cooling devices, and various feed ports was charged at 20 to 25° C. (room temperature) under atmospheric pressure (1 atm ≙1.013 bar absolute) with
423.0 g of deionized water and
14.0 g of a 20% strength by weight aqueous solution of a fatty alcohol polyethoxylate (Lutensol® AT 18 from BASF SE)
18.7 g of a 15% strength by weight aqueous solution of the sodium salt of a $C_{12}$ alkyl sulfate
53.2 g of the monomer emulsion (see below)
and then heated with stirring (140 rpm) to an internal temperature of 85° C. After this temperature had been reached, 5 weight % of the initiator solution was added in one portion, and the resulting mixture was stirred for 5 minutes. Thereafter, beginning simultaneously, the total amount of the monomer emulsion was metered in over the course of 185 minutes, and the remaining amount of the initiator solution was metered in over the course of 195 minutes, the metered feeds taking place continuously, at constant flow rates, via spatially separate feed ports.

Initiator Solution:
7 g of sodium peroxodisulfate
93 g of deionized water
Monomer Emulsion:
821.0 g of deionized water
30 g of a 20% strength by weight aqueous solution of a fatty alcohol polyethoxylate (Lutensol® AT 18 from BASF SE)
50.0 g of a 15% strength by weight aqueous solution of sodium lauryl sulfate
758.2 g of methyl methacrylate
694.8 g of ethylhexyl acrylate
18 g of acrylic acid, and
41.8 g of a 50% strength by weight aqueous solution of acrylamide.

The reaction mixture was then left to continue reacting at the aforementioned temperature for a further 15 minutes, after which the mixture was cooled to room temperature. The aqueous polymer dispersion obtained was subsequently adjusted to a pH of 8, using a 25% strength by weight aqueous ammonium hydroxide solution. The resulting polymer dispersion had a solids fraction of 50.5 weight %, a number-average particle diameter of 130 nm, and a glass transition temperature of 17° C.

Performance Tests a) Production of the Paint Formulations

From the ingredients indicated in table 1 below (amounts in g), in the order stated from top to bottom, at room temperature and with stirring using a disk stirrer at 1000 revolutions per minute, the paint formulations based on the aqueous polymer dispersions of the examples were produced.

TABLE 1

| Paint formulation A (slightly siliconized exterior paint) | |
|---|---|
| Paint formulation | A |
| deionized water | 207.0 |
| thickener[1] | 3.0 |
| dispersant[2] | 4.0 |
| dispersant[3] | 3.0 |
| bactericide[4] | 2.0 |
| defoamers[5] | 2.0 |
| pigment[6] | 100.0 |
| filler[7] | 135.0 |
| filler[8] | 222.0 |
| polymer dispersion as per example | 251.0 |
| silicone resin emulsion[9] | 30.0 |
| film-forming assistant[10] | 25.0 |
| thickener[11] | 8.5 |

[1] Bentone LT from Elementis PLC, London, GB
[2] Pigmentverteiler MD20, BASF SE, Ludwigshafen
[3] 25% strength by weight aqueous sodium polyphosphate solution, BK Giulini, Ladenburg
[4] Parmetol A26, Schülke & Mayr GmbH, Norderstedt
[5] Byk® 022 from Byk Chemie GmbH
[5] Propyleneglycol from BASF SE
[6] Titanium dioxide Kronos® 2190 from Kronos GmbH
[7] Finntalc® M 15 (talc) from Mondo Minerals B.V.
[8] Minex 10, Unimin Speciality Minerals Inc. USA
[9] Silres 1306, Wacker Chemie AG, Burghausen
[10] Butyldiglycol from BASF SE
[11] Collacral PU70 from BASF SE Following addition of the final component, stirring was continued for 15 minutes and then the resulting paint formulation was left to rest, without stirring, for 1 hour.

The paint formulation possesses a solids content of approximately 58% and a pigment volume concentration of 57.

Color pastes were stirred additionally into the paint formulation, to give a significantly deep, pastel shade. The paints were colored preferably using organic pigments, since these paints, from experience, are less stable in the artificial weathering tests than paints with inorganic pigments. Having performed particularly sensitively are paints with a signal red tinting paste (organic), and hence that shade was often used as a test shade for paint stability testing. In each case 15 g of "Luconyl" pigment paste from BASF SE were used to in each case 1000 g of paint according to the formula above.

b) Production of the Coated Test Substrates

The aforementioned paint formulation was applied using a paint roller to fiber cement boards measuring 20×30 cm in such a way that the weight per unit area (wet) was in each case 300 g/m². The resultant coatings were then dried for 7 days in a climate chamber at 50% relative humidity and 23° C.

c) Weathering Trials

For the artificial testing of the weathering stability of the paints on fiber cement boards, a xenon test in accordance with DIN EN ISO 11341 (cycle A) for paints is carried out, with inspection taking place after 500 hours (or after 150 hours with the Suntest device). In this xenon test, coated fiber cement boards measuring 5*13 cm are subjected in each case in alternation to 102 minutes of dry illumination and 18 minutes of illumination during which the plaques are wetted with a fine water mist. The relative humidity is set at 50% and the black standard temperature is 65° C. The intensity of irradiation corresponds to 60 W UV light at 300-400 nm or 0.51 W/(m²·nm) at 340 nm light wavelength.

The coatings on fiber cement boards were subjected for outdoor weathering as well in parallel with the artificial weathering. In the outdoor weathering, the coated fiber cement boards with the coating upward were oriented in such a way that the inclination to the perpendicular was 60° (0° denotes perpendicular, 90° denotes horizontal to the earth's surface). The overall orientation of the coatings was to be south west. After a given time, the coatings were measured with a colorimeter, in analogy to the methodology with the artificial weathering, and the color deviation delta E was evaluated in comparison to the unweathered reference paint.

The color values after weathering must be measured after full through-drying of the paint. The coatings were tested by measuring the color in accordance with DIN 6174: "Colorimetric determination of color coordinates and color differences in the approximately uniform CIELAB color space" before and after weathering (L*a*b* color values), giving a color deviation from storage of delta E=root ((L$_1$−L$_2$)^2+(a$_1$−a$_2$)^2+(b$_1$−b$_2$)^2).

Table 3
Results of the Weathering Tests

It can be seen that in all of the test methods, both in artificial accelerated weathering and in outdoor weathering, the test paint of the invention, for all of the organic color pigments listed, exhibits less color fading, based on the color difference DE (as described above), than the comparative paint with a prior-art binder having only one principal monomer M1 and M2 each.

|  | Delta E | | | |
| --- | --- | --- | --- | --- |
|  | 150 h Suntest | 500 h Xenotest | 6 months' outdoor weathering | 12 months' outdoor weathering |
| Inventive paint, signal red |  | 2.5 |  | 3.5 |
| Comparative paint, signal red |  | 6.7 |  | 8.2 |
| Inventive paint, dark blue |  |  | 5.6 |  |
| Comparative paint, dark blue |  |  | 6.09 |  |
| Inventive paint, neutral red |  |  | 7.78 |  |
| Comparative paint, neutral red |  |  | 8.67 |  |
| Inventive paint, signal red |  |  | 4.77 |  |
| Comparative paint, signal red |  |  | 5.51 |  |
| Inventive paint, signal red (PVC 60%) | 11.89 |  |  |  |
| Comparative paint, signal red (PVC 60%) | 13.42 |  |  |  |
| Inventive paint, clear orange |  |  | 3.31 |  |
| Comparative paint, clear orange |  |  | 4.13 |  |
| Inventive paint, pure violet |  |  | 6.3 |  |
| Comparative paint, pure violet |  |  | 7.23 |  |
| Inventive paint, pure violet (PVC 60%) | 14.47 |  |  |  |
| Comparative paint, pure violet (PVC 60%) | 16.04 |  |  |  |
| Inventive paint, yellow |  |  | 4.97 |  |
| Comparative paint, yellow |  |  | 6.46 |  |
| Inventive paint, yellow (PVC 60%) | 9.65 |  |  |  |
| Comparative paint, yellow (PVC 60%) | 10.72 |  |  |  |
| Inventive paint, green-yellow |  |  | 4.04 |  |
| Comparative paint, green-yellow |  |  | 4.76 |  |
| Inventive paint, dark blue |  |  | 5.6 | 7.7 |
| Comparative paint, dark blue |  |  | 6.09 | 8.13 |
| Inventive paint, neutral red |  |  | 7.78 | 10.09 |
| Comparative paint, neutral red |  |  | 8.67 | 10.7 |
| Inventive paint, signal red |  | 2.5 | 4.77 | 8.94 |
| Comparative paint, signal red |  | 6.7 | 5.51 | 9.67 |
| Inventive paint, signal red (PVC 60%) | 11.89 |  |  |  |
| Comparative paint, signal red (PVC 60%) | 13.42 |  |  |  |
| Inventive paint, clear orange |  |  | 3.31 | 7.37 |
| Comparative paint, clear orange |  |  | 4.13 | 8.97 |
| Inventive paint, pure violet |  |  | 6.3 | 11.2 |
| Comparative paint, pure violet |  |  | 7.23 | 11.36 |
| Inventive paint, pure violet (PVC 60%) | 14.47 |  |  |  |
| Comparative paint, pure violet (PVC 60%) | 16.04 |  |  |  |
| Inventive paint, yellow |  |  | 4.97 | 12.85 |
| Comparative paint, yellow |  |  | 6.46 | 13.94 |

-continued

|  | Delta E | | | |
| --- | --- | --- | --- | --- |
|  | 150 h Suntest | 500 h Xenotest | 6 months' outdoor weathering | 12 months' outdoor weathering |
| Inventive paint, yellow (PVC 60%) | 9.65 | | | |
| Comparative paint, yellow (PVC 60%) | 10.72 | | | |
| Inventive paint, green-yellow | | | 4.04 | 6.6 |
| Comparative paint, green-yellow | | | 4.76 | 6.77 |

The invention claimed is:

1. A method for improving color retention in an exterior paint comprising adding as a binder to the exterior paint an aqueous polymer dispersion obtained by polymerization of:
   (a) at least two monomers M1 having a glass transition temperature ≥25° C.,
   (b) at least two monomers M2 having a glass transition temperature <25° C.,
   and at least one monomer M3,
   wherein the binder comprises 17 to 27% of the monomers M1, which are methyl methacrylate and styrene, 68 to 77% of the monomers M2, which are n-butyl acrylate and 2-ethylhexyl acrylate, and 0.1 to 10% of the at least one monomer M3, and wherein the amount of styrene in the case of the monomers M1 is from 5 to 15%.

2. The method according to claim 1, wherein the at least one monomer M3 is selected from the group consisting of acrylic acid, methacrylic acid, acrylamide, hydroxyethyl (meth)acrylate, and hydroxypropyl (meth)acrylate.

* * * * *